Jan. 16, 1923.  
B. A. KELLY.  
AUTOMOTIVE VEHICLE.  
FILED NOV. 15, 1921.
1,442,220.
2 SHEETS—SHEET 1.
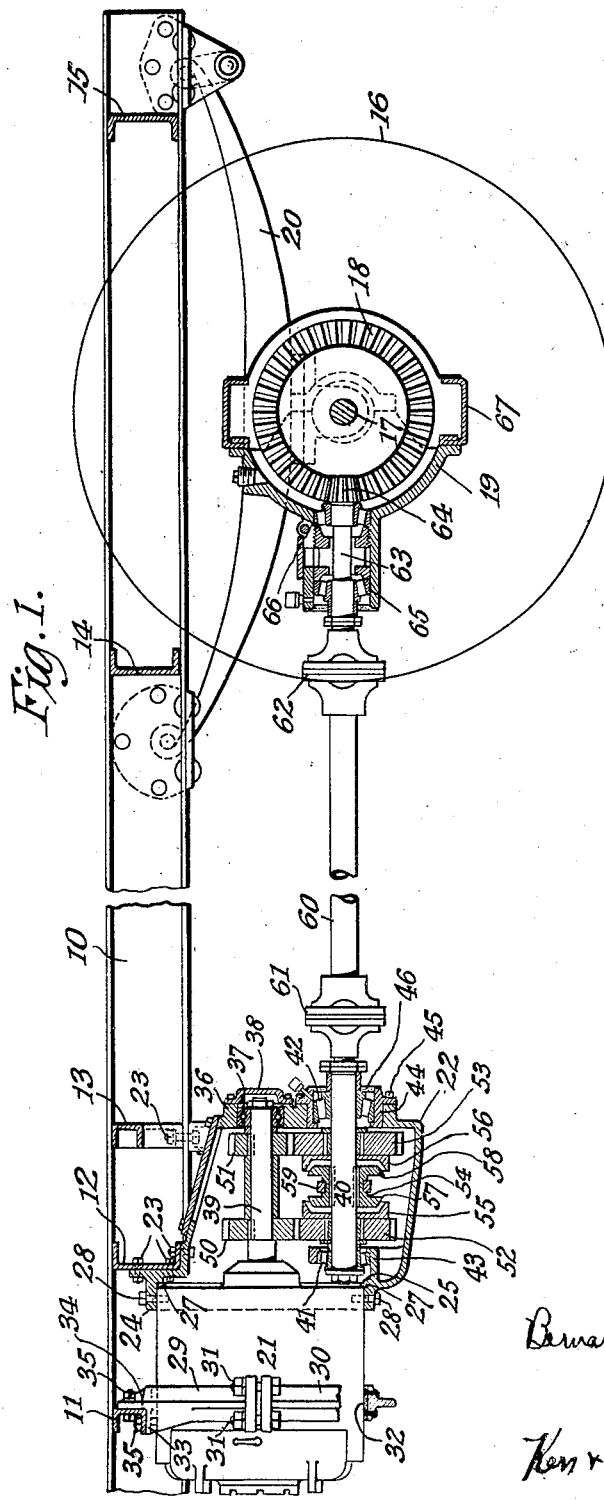

Jan. 16, 1923.
B. A. KELLY.
AUTOMOTIVE VEHICLE.
FILED NOV. 15, 1921.
1,442,220.
2 SHEETS—SHEET 2.
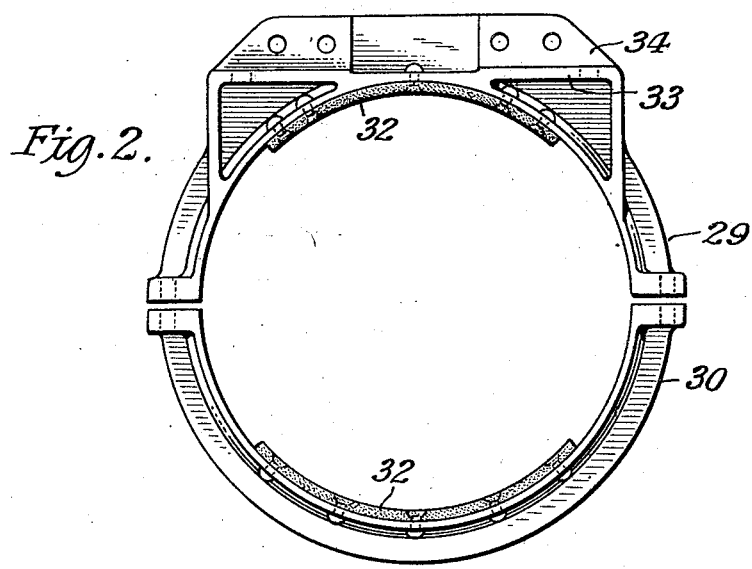
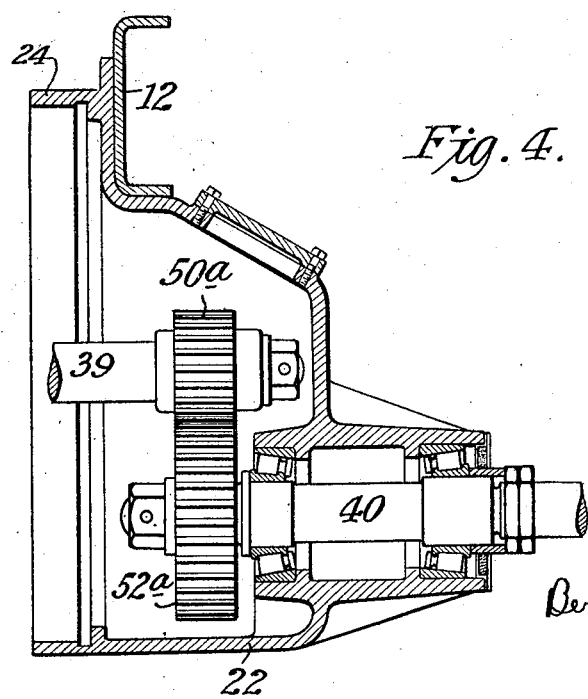
Bernard A. Kelly,
INVENTOR,
BY Cooper, Kerr &
Dunham, his ATTORNEYS.

Patented Jan. 16, 1923.

1,442,220

UNITED STATES PATENT OFFICE.

BERNARD A. KELLY, OF EAST ORANGE, NEW JERSEY.

AUTOMOTIVE VEHICLE.

Application filed November 15, 1921. Serial No. 515,251.

*To all whom it may concern:*

Be it known that I, BERNARD A. KELLY, being a citizen of the United States of America, residing at East Orange, in the county of Essex and State of New Jersey, have invented certain new and useful Improvements in Automotive Vehicles, of which the following is a full, clear, and exact description.

This invention relates to automotive vehicles. More specifically it relates to that class of automotive vehicles in which the driving motors are electric.

One of the principal objects is to provide an electric propelling system in which the unsprung weight is a minimum.

Another object is to provide an electric propelling system in which the reaction due to the torque exerted by the motor or motors, particularly at starting, is transmitted to the vehicle frame rather than to the remaining structure.

A further object is to provide an electric propelling system in which the propeller shaft is practically straight and its angularity reduced to a minimum, thereby making it possible to employ universal joints of the fabric disk type which prevent sudden shocks in the transmission of torque from the motor to the rear axles.

A still further object is to provide an arrangement whereby the distance between the vehicle frame and the road may be made a minimum without seriously reducing the necessary road clearance of the vehicle. This is an important advantage in that loading of the vehicle is greatly facilitated, the balance of the vehicle, especially when loaded, is improved, and the driver may more easily mount and dismount than is the case when higher frame vehicles are employed. Other objects and advantages will appear as the invention is hereinafter disclosed.

Referring to the drawings which illustrate what I now consider preferred forms of my invention:

Fig. 1 is a fragmentary longitudinal sectional elevation, partly diagrammatic, of one form of the invention.

Fig. 2 is an elevation of a motor hanger shown in Fig. 1.

Fig. 3 is a detail view of one of the journal housings forming a part of the transmission housing shown in Fig. 1.

Fig. 4 is a sectional elevation of a modified form of transmission.

Fig. 5 is a view similar to Fig. 4 but illustrating a modified form of selective transmission.

While my invention is adaptable to various classes and types of vehicles it is particularly well adapted for use in connection with trucks. The particular design selected for the purpose of illustration herein, is one adapted for such use. To avoid surplusage in illustration I have illustrated only so much of a truck as is necessary for a proper compehension of the invention. Calling particular attention to Fig. 1, it will be seen that the truck includes the usual frame of channel members comprising side frame members, one of which is shown at 10, and cross-members, some of which are illustrated at 11, 12, 13, 14 and 15. It will be hereinafter pointed out that certain of the cross or transverse members depart from the usual construction. The truck comprises also the usual rear wheels 16, axles 17, differential (not shown), ring gear 18, differential and axle housing 19 upon which the frame of the vehicle is supported by suitable springs 20. The construction and operation of the structure thus far described in detail is the usual structure common in commercial vehicles and will be readily understood by those skilled in the art, as will also the construction and operation of other necessary or desirable parts, such as the truck body, radius rods, brakes, etc., not shown.

In accordance with my invention I provide an electric motor 21, preferably rigidly secured to the vehicle frame, and a novel combination of power-transmitting connections between the motor and the ring gear 18. One of the preferred forms of structure embodying the invention will now be described. A transmission housing or casing 22, preferably oil or grease tight, is rigidly secured to the cross or transverse frame members 12, 13, by means of suitable bolts 23. One end of the housing 22 is open and provided with a substantially cylindrical portion 24 adapted to receive one end of the casing of a standard electric motor 21 to support the same. It will be noted that the cylindrical portion 24 is shown provided with an annular flange 25 against which the entering end of the motor casing is adapted to seat, a suitable packing or gasket 27 being provided between these abutting parts. The motor casing is shown rigidly but detachably secured to the transmission housing by means of cap screws 28, each of which extends through a suitable opening in the cylindrical portion 24 and into a tapped hole in the motor casing. In order to aid in supporting the motor and thereby to relieve the housing 22 of static as well as torsional strains, I provide an additional bracket or hanger. The latter is preferably constructed of two or more parts to facilitate assembly and disassembly of the parts thus far described.

Referring to Figs. 1 and 2 it will be seen that the motor bracket or hanger comprises a lower part 30 and an upper part 29 which form a split ring or annulus adapted to surround and grip the periphery of the motor casing when the bolts 31 are drawn up. It will be seen, upon inspection of the drawings, that the latter extend through suitable flanges provided on the bracket parts 29 and 30. It is important that there be no relative rotation or slipping between the motor casing and hanger 29, 30, when the parts are assembled and in operation, and to insure that such relative movement will be prevented I prefer to provide friction pads or liners 32, 32. These are shown riveted to the bracket sections 29, 30 and may be of any suitable material such as that commonly employed for brake linings in vehicles.

The upper part 29, of the hanger, is provided with a horizontal flange 33 and a vertical flange 34, which, together, form an L-shaped or angled aligning portion adapted to engage the lower flange and web of the transverse frame member 11. Suitable bolts 35 detachably but rigidly secure the section 29, and consequently the entire hanger, to the frame of the vehicle.

The transmission housing 22 contains the transmission mechanism, this term being employed to include either selective or non-selective transmissions. In Fig. 1 a transmission of the selective type is disclosed. The housing 22 is shown provided with a journal housing 36 adapted to receive a ball-bearing, or other suitable bearing, 37, in turn adapted to receive the motor shaft 39. A detachable cap 38 serves to permit access to the last mentioned bearing and to form a seal when the parts are assembled. A shaft 40 is journaled for rotation in the housing 22, at a position below the shaft 39, in thrust roller bearings 41, 42, or other suitable bearings. The bearings 41 and 42 are each mounted in the journal housings 43, 44, respectively. It will be noted that the housing 44 is detachably secured to the transmission housing proper by means of capscrews 45 and that a seal 46 is provided for the said housing 44. Preferably, and for a purpose which will hereinafter appear, the journal housing 43 is split, as shown in Fig. 3, to form a cap portion 43$^a$ detachably secured to the remaining portion 43$^b$ of the housing. First pointing out that the shaft 40 is rotatable but constrained against endwise movement, I shall now proceed to describe one form of selectively operable means for effecting a drive connection between the shafts 39 and 40.

The shaft 39 has keyed thereto a plurality of gears 50, 51, each of which meshes with a corresponding one of the gears 52, 53, rotatably mounted upon and with respect to the shaft 40 but constrained against axial endwise movement with respect thereto. The shaft 40 carries a sleeve 54, said sleeve being keyed to the shaft so as to be relatively slidable with respect thereto but, in any of its positions, to be operatively connected to impart any rotation of said sleeve to said shaft. Each of the gears 52, 53 has secured thereto an element 55 or 56 of a cone clutch. The sleeve 54 has secured thereto the cone elements 57 and 58 adapted to cooperate with the elements 55, 56 to form a pair of selectively operable clutches. Any suitable form of manually operable or manually controllable instrumentalities, including a yoke 59, may be employed for shifting the sleeve 54 endwise in one direction or the other to control the clutches 55—57 or 56—58.

The shaft 40 is operatively connected to a propeller shaft 60 by means of a universal shaft coupling 61, preferably of the fabric disc type. The propeller shaft 60 is in turn operatively connected with a shaft 63 by means of a universal shaft coupling 62, also preferably of the fabric disc type. The shaft 63 has secured thereto a pinion 64 which meshes with the ring gear 18, and said shaft is rotatably mounted in roller thrust bearing 65, 66 supported by the differential housing 19. In view of the foregoing disclosure the ease with which the parts may be assembled and disassembled will be apparent to those skilled in the art. By backing off the bolts 28, 31 the motor 21 together with its shaft 39 and gears 50, 51 and bearing 37 may readily be removed from the transmission housing 22. By removing the journal housing 44 and the cap section 43$^a$ (see Fig. 3) the shaft 40 and structure connected thereto may be removed from the transmission housing through the motor-receiving opening thereof.

In operation, the motor 21 is energized from a suitable source (not shown) such as a storage battery, the electrical control being effected through any desired and usual controller, rheostat and reversing controller. By manually moving the sleeve 54 to right or left either of the clutch elements 58, 57 may be engaged with its corresponding clutch element 56 or 55 to establish a drive connection between the motor shaft 39 and the shaft 40. Motion of the latter is transmitted to the ring gear 18, by means of the elements 61, 62, 63 and 64, and thence to the rear wheels 16 by means of the usual differential and rear axle connections. The gear ratio between the shafts 39 and 40 may be varied at will by operation of the sleeve 54.

It will be seen that I have provided a system accomplishing the objects and possessing the advantages above enumerated, as well as other advantages now apparent in view of the disclosure. The invention may be modified in various respects without departing from the general scope thereof as defined in certain of the claims appended hereto. Thus, instead of employing a selective transmission a non-selective one may be employed as indicated in Fig. 4.

In Fig. 4 the parts 12, 22, 24, 39 and 40, and other parts not designated, will be found to correspond to similar parts shown in Fig. 1. However, in the form of invention shown in Fig. 4 the pinion gear $50^a$ is keyed, or otherwise fixed, to the motor shaft 39 and the gear $52^a$ is keyed, or otherwise fixed, to the shaft 40.

The differential housing 19 is prevented from turning about the axes of the axles 17 either by means of a suitable torsion rod or by spring seats fixed to the axle housing 67, the latter form being preferred as shown in dotted lines in Fig. 1. In this case, i. e. where fixed spring seats are employed, the forward ends of the springs 20 are pivotally connected to the frame 10 as shown in Fig. 1.

It will be understood that if the motor 21 employed is a series motor the current to the latter will be manually or automatically cut off when the clutch elements 57, 58 are in neutral or non-operative position.

If the gears in the transmission housing, shown in Fig. 1 are to be run comparatively dry the clutches there illustrated are quite satisfactory. I prefer, however, to fill or partially fill the transmission housing 22 with oil or grease in which event ratchet or dog clutches, such as those illustrated in Fig. 5, would be employed instead of friction clutches. In Fig. 5 the elements 55'—57' cooperate to form one dog or ratchet clutch and the elements 56' and 58' the other. Otherwise the mechanism shown in Fig. 5 is the same in construction and operation as that shown in Fig. 1.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relation described, some of these may be altered, others omitted and some of the features of each modification embodied in the others without interfering with the more general results outlined and the invention extends to such use.

What I claim is:—

1. An automotive vehicle comprising in combination, a plurality of traction wheels, a frame, means resiliently supporting said frame upon said wheels, a transmission housing connected to said frame and wholly supported thereby, an electric motor connected to said housing, a hanger rigidly connecting the casing of the motor to said frame, and means including gearing and universal shaft connections for operatively connecting the shaft of said motor to said traction wheels.

2. An automotive vehicle comprising in combination, a plurality of traction wheels, a frame, means resiliently supporting said frame upon said wheels, a transmission housing connected to said frame and wholly supported thereby, an electric motor whose casing extends into and is supported at least in part by said transmission housing, a hanger rigidly connecting said motor casing to said frame, and means including gearing and universal shaft connections for operatively connecting the shaft of said motor to said traction wheels.

3. An automotive vehicle comprising in combination, a plurality of traction wheels, a frame, means resiliently supporting said frame upon said wheels, a transmission housing rigidly connected to said frame, an electric motor whose casing extends into and is supported at least in part by said transmission housing and whose shaft extends into said housing, a hanger rigidly connecting said motor casing to said frame, a shaft journaled in said housing below the shaft of said motor, gearing in said housing and connecting the two last named shafts, a third shaft connected to said second-named shaft by means of a universal coupling, a fourth shaft connected to said third shaft by means of a universal coupling, the axes of said second, third and fourth shafts forming a substantially straight line under average load of the vehicle, and means including gearing operatively connecting said fourth shaft and traction wheels.

4. An automotive vehicle comprising in combination, a plurality of traction wheels, a frame, means resiliently supporting said frame upon said wheels, a transmission housing connected to said frame and wholly supported thereby, an electric motor whose casing is attached to said transmission housing and at least partly supported thereby, a hanger rigidly connecting said motor casing to said frame, transmission gearing located in said transmission housing, and means including universal shaft connections and said gearing for operatively connecting the shaft of said motor to said traction wheels.

5. An automotive vehicle comprising in combination, a plurality of traction wheels, a frame, means resiliently supporting said frame upon said wheels, a transmission housing, supporting means rigidly connecting said housing to said frame, an electric motor, means detachably connecting the casing of said motor to said frame and to said housing whereby said motor may be dismounted without disconnecting said housing from said frame, and means including gearing in said housing and universal shaft connections for operatively connecting the shaft of said motor to said traction wheels.

6. An automotive vehicle comprising in combination, a plurality of traction wheels, a frame, means resiliently supporting said frame upon said wheels, a transmission housing rigidly connected to said frame, an electric motor having a motor casing detachably connected to and supported at least in part by said transmission housing and whose shaft extends into said housing, a hanger rigidly connecting said motor casing to said frame, a shaft journaled in said housing below the shaft of said motor, gearing in said housing and connecting the two last named shafts, a propeller shaft which is substantially co-axial with said second named shaft under average load of the vehicle, and means including a universal joint operatively connecting said propeller shaft to said second named shaft and to said traction wheels.

7. An electric automotive vehicle comprising in combination, a plurality of traction wheels, a frame, means resiliently supporting said frame upon said wheels, a transmission housing connected to said frame and wholly supported thereby, an electric motor having a shaft extending into said housing, transmission gearing in said housing including a plurality of gears upon said motor shaft, and a bearing in said housing for supporting the end of the motor shaft.

8. An automotive vehicle comprising in combination, a plurality of traction wheels, a frame, means resiliently supporting said frame upon said wheels, a transmission housing connected to said frame and wholly supported thereby, an electric motor connected to said housing, means rigidly connecting the casing of the motor to said frame, and means including gearing and universal shaft connections for operatively connecting the shaft of said motor to said traction wheels.

In testimony whereof I hereto affix my signature.

BERNARD A. KELLY.